Figure 1:
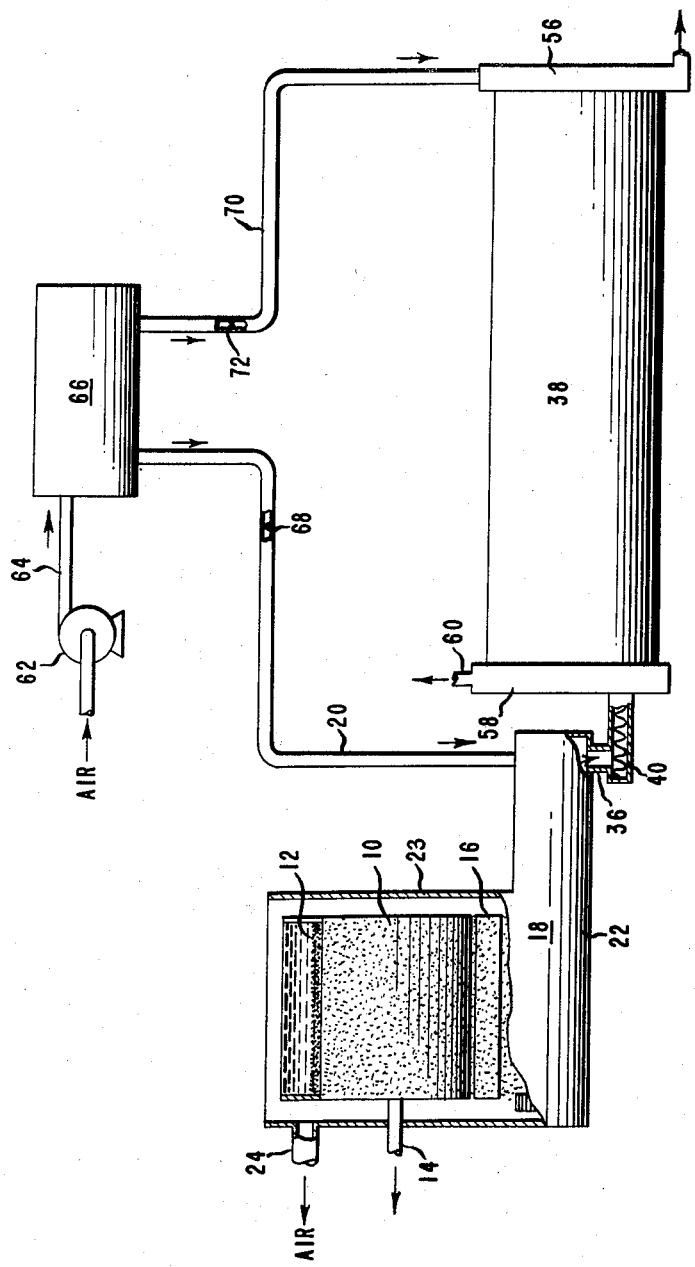

July 12, 1960

C. P. GREEN ET AL 2,944,344

DRYING OF CYANIDES

Filed Oct. 15, 1957

2 Sheets-Sheet 1

INVENTORS
CHARLES P. GREEN
WILLIAM R. JENKS

BY

ATTORNEY

July 12, 1960

C. P. GREEN ET AL 2,944,344

DRYING OF CYANIDES

Filed Oct. 15, 1957

2 Sheets-Sheet 2

INVENTORS
CHARLES P. GREEN
WILLIAM R. JENKS

BY

*Norris E. Bruckman*

ATTORNEY

United States Patent Office 2,944,344
Patented July 12, 1960

2,944,344

DRYING OF CYANIDES

Charles P. Green and William R. Jenks, Memphis, Tenn., assignors to E. I. du Pont de Nemours and Company, Wilmington, Del., a corporation of Delaware Filed Oct. 15, 1957, Ser. No. 690,322

3 Claims. (Cl. 34—17)

This invention relates to the production of alkali metal cyanides and is more particularly concerned with an improved process and apparatus for drying alkali metal cyanide crystals produced by the wet process.

In the commercial wet process for preparing alkali metal cyanide, the cyanide is continuously produced in aqueous solution by reacting hydrogen cyanide with alkali metal hydroxide in solution, crystals of alkali metal cyanide are continuously produce by evaporating water from the aqueous solution in a continuously operating crystallizer, wet crystals are continuously separated from mother liquor by filtration, and a granular product is continuously recovered by drying the wet crystals. This granular product may be further processed into briquettes or other physical forms desired for commercial uses. In order to produce substantially pure crystals of alkali metal cyanide the crystallizer is usually operated to give a slurry containing about 10% crystals and about 90% mother liquor. The crystals are then separated as a wet filter cake by continuous filtration, as by means of a continuous rotary vacuum filter, and the mother liquor filtrate is recycled to the crystallizer or to an earlier stage of the process.

Under the best commercial conditions the filter cake will still contain about 11% to 13.5% water, which must be removed by drying. It has previously been the practice to evaporate this water by contacting the crystals with a heated surface, usually by tumbling the crystals in a rotary steam tube dryer in which the heat required to drive off the water is supplied by condensation of steam in the tubes. This method of drying has major disadvantages. If the material being dried contains more than 6% moisture, it cakes on the heat tranfer surfaces and seriously reduces the drying rate. Therefore, it was necessary to mix the filter cake with sufficient dry product to bring the moisture content within the range of 3% to 6% moisture before drying could proceed at a satisfactory rate with equipment of an economical size. An even more series difficulty has been the decomposition of metal cyanide to metal formate during the drying operation. This represents a loss of product but, worse than that, sodium formate as an impurity in sodium cyanide in quantities greater than 0.3% makes it unusable in many applications, such as heat-treating operations. When drying a filter cake containing less than 0.3% sodium formate by previous drying methods a product containing 0.7% or more of sodium formate was obtained in spite of all efforts to avoid such decomposition.

It is an object of this invention to provide, in the wet process for producing alkali metal cyanide, an improved process for drying the wet alkali metal cyanide crystals which avoids having to mix dry product with the wet crystals before drying and which substantially eliminates decomposition to formates during drying. Another object is to provide a suitable drying apparatus for practicing the improved process. Further objects will become apparent from the specification and claims.

The above objects are accomplished in accordance with this invention by evaporating the water from the wet crystals with hot air while mixing the crystals to maintain the surfaces wet until the average moisutre content of the crystals decreases to less than 2%. This is preferably accomplished by feeding the filter cake of wet crystals to a mixing conveyor, drying the wet crystals to a maximum moisture content of 10% solely with hot air while in the mixing conveyor, feeding the partially dried crystals to a rotary drier, and completing the drying in the rotary dried with hot air as the sole source of heat. Preferably the hot air supplied to the above drying steps is at a temperature of 400° to 800° F.

It has now been found that sodium cyanide must be dried at temperatures which do not exceed 150° F. in order to avoid decomposition according to the reaction,

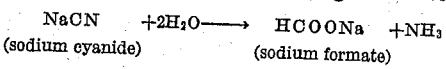

and that the rate at which sodium formate is produced increases rapidly as the temperature of the wet sodium cyanide increases during drying. The total drying time is also a factor. It is utterly impractical to attempt to supply sufficient heat for drying by means of a heat transfer surface maintained at a maximum temperature of 150° F.

It is quite unexpected that the formation of sodium formate can be avoided during the drying of sodium cyanide crystals with hot air at temperatures much higher than 150° F. When hot air is used as the sole source of heat for drying and adequate mixing is provided in accordance with the present invention, it has been found that the temperature of a wet crystal of sodium cyanide does not rise above the adiabatic saturation temperature of air over the residual mother liquor as long as there is sufficient liquor to wet the surfaces of the crystal, even though the temperature of the air is 700° F. or above. The temperature of crystals can not go above 150° F., with the efficient mixing of this invention, until the average moisture content of the crystals decreases to less than 2%. The process makes possible the rapid drying of wet sodium cyanide crystals with air at such high temperatures as 700° F. or above without raising the temperature of the wet sodium cyanide above 150° F. until the moisture content is less than 2%. Hence the wet crystals can be dried rapidly with only a negligible decomposition to sodium formate occurring during the drying operation. Caking of the crystals is avoided and there is no need to mix the wet crystals with dry product in preparation for drying.

Figure 2:
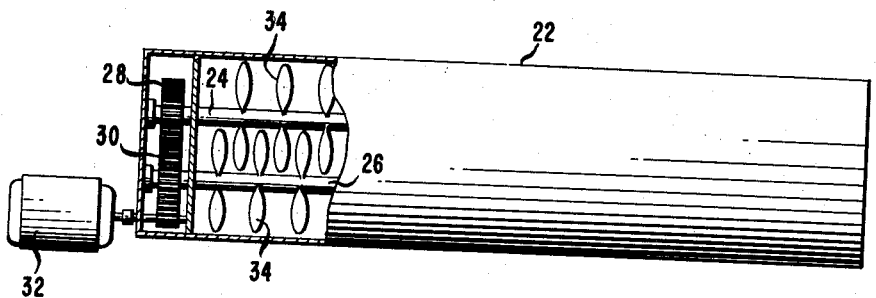
Figure 3:
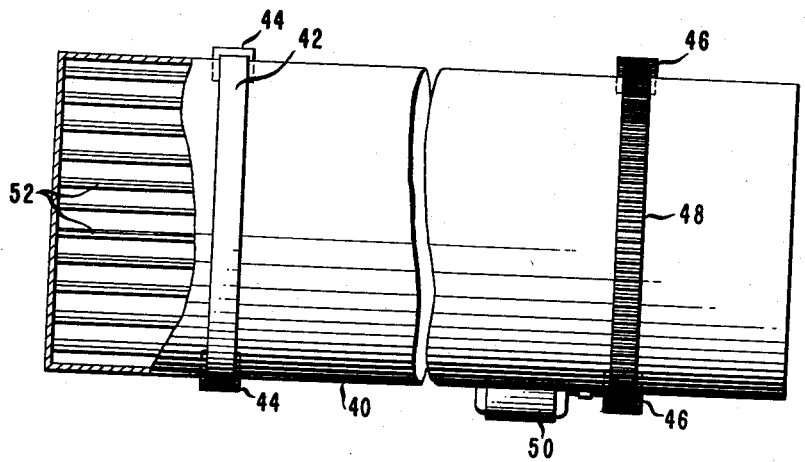

The novel apparatus of this invention will be explained by reference to the drawings. In the drawings, which illustrate a preferred embodiment of the apparatus, Figure 1 is a diagrammatic representation of the filtering and drying apparatus, Figure 2 is a top view, partially cut away, of the mixing conveyor, and Figure 3 is a top view, partially cut away, of the rotary drier.

Referring to Fig. 1, a slurry of about 10% sodium cyanide crystals and 90% mother liquor is fed to a rotary vacuum filter 10. Most of the liquid is removed from the crystals to form a wet filter cake 12 containing about 12% to 13% moisture. The filtrate is withdrawn from within the filter through pipe 14 which leads to a vacuum system for maintaining the inside of the filter under reduced pressure in conventional manner. The filter cake is scraped off of the outer surface by doctor blade 16 and falls into a mixing conveyor 13.

Hot air is supplied through duct 20 to the exit end of the mixing conveyor, passing countercurrently to the sodium cyanide and into an enclosure 23 surrounding the rotary filter. This enclosure is sealed to the jacket 22 of the mixing conveyor to avoid loss of air and is provided with an exhaust duct 24 through which the air passes to suitable means for removing any particles of sodium cyanide, such as a vent scrubber, before venting the air to the atmosphere. Except for the above provision for passing hot air over the sodium cyanide, the mixing conveyor is of conventional design. As shown in Fig. 2, it comprises two horizontal, parallel shafts 24 and 26 which are geared together to rotate in opposite directions by gears 28 and 30 driven by suitable means, such as a motor 32. A plurality of blades 34 are arranged along the shafts so that the blades on one shaft pass between those on the other shaft. These blades are pitched at angles like propellers to provide intense agitation and move the sodium cyanide along toward the exit end of the conveyor. The blades break up any lumps and expose the crystals uniformly to the hot air during this preliminary drying. The crystals are dried to a moisture content of 5 to 10%, and preferably about 8% moisture, while passing through this conveyor.

The partially dried crystals leave the conveyor through discharge opening 36 and are introduced into rotary drier 38. The conveyor can discharge directly into the drier but it is more convenient to introduce the sodium cyanide into the drier with a screw conveyor 40 or other conventional feeding means. This final drier is a conventional type of rotary drier designed to tumble the material being dried through a current of hot gas. As shown in Fig. 3, it consists essentially of a cylindrical steel shell 40 supported horizontally on steel tires 42, secured to the outside of the shell, which rest on rollers 44 mounted in suitable bearings. The shell is rotated on its horizontal axis by pinions 46 meshing with a large gear 48, which extends completely around the outside of the shell and is fastened to it. The pinions are driven by suitable means, a motor 50 being indicated. Vanes or tubes 52 are secured at intervals around the inside of the shell to tumble the sodium cyanide being dried through air used for drying.

The drier is inclined slightly, with the discharge end lower than the feed end, so that the sodium cyanide progresses through the drier at the desired rate to the product discharge duct 54. The flow of sodium cyanide is also controlled by the rate of rotation of the shell.

The discharge end of the drier is enclosed by a hood 56, so that drying air can be blown through the shell. The feed end is also enclosed by a hood 58, and this hood is provided with an exhaust duct 60 which carries the air to means for removing sodium cyanide dust before discharging the air to the atmosphere.

Air for drying is supplied by a blower 62, such as a radial vane centrifugal blower. The air passes through duct 64 to an air heater 66. This heater is suitably of a gas-fired type adapted to heat the air up to about 700° F. or above. The blower and heater should have sufficient capacity to supply up to about 64,000 standard (1 atm., 0° C.) cubic feet per ton of sodium cyanide of ambient air at about 700° F. The heated air leaves the heater through two ducts. A part of the air passes to the mixing conveyor through duct 20, the amount being regulated by a damper-type valve 68. The remainder of the heated air passes through a duct 70 to hood 56, and thence passes through the rotary drier countercurrently to the flow of sodium cyanide being dried. A valve 72 is provided in duct 70 to regulate this flow of air as necessary to maintain the desired product dryness together with minimum dusting.

In the mixing conveyor the intense agitation provides good contact of the wet sodium cyanide crystals with the drying air and prevents the formation of lumps. The crystals are dried to a maximum of 10% moisture so that they will dry satisfactorily in the rotary drier. When the wet crystals contain about 12% to 13% moisture after the vacuum filtration, up to about one-half of this moisture can be removed conveniently before the crystals are discharged to the rotary drier. About 32,000 cubic feet per ton of sodium cyanide of air heated to about 700° F. or above is preferably supplied to the mixing conveyor for this purpose. The rotary filter can be used to supplement this preliminary drying by arranging the operation so that part of the heated air is drawn through the filter cake. As shown in Fig. 1, the air passes from the mixing conveyor into the enclosure 22 surrounding the filter. Part of this can be drawn into the inside of the filter drum and removed with the filtrate by providing an adequate vacuum pump. If desired, part of the heated air can be supplied directly from heater 66 to the filter enclosure for this purpose.

The partially dried crystals are now in a condition where they can be dried without caking or overheating by tumbling through hot air in the rotary drier. About 32,000 cubic feet per ton of sodium cyanide of air heated to about 700° F. or above will complete the drying of the sodium cyanide.

When drying sodium cyanide as described above, no measurable amount of decomposition takes place during the drying and the sodium formate content of the product is readily maintained below 0.3%. Caking of sodium cyanide in the rotary drier is eliminated, and there is no need for recycling dry product and mixing it with wet filter cake. Because recycling is unnecessary, and only part of the drying is accomplished in the rotary drier, the load on this drier is reduced tremendously and a much smaller drier will handle the same amount of product or the capacity of the same equipment is greatly increased. Hence the invention substantially improves the quality of product and decreases the cost of producing it.

Since many different embodiments of the invention may be made without departing from the spirit and scope thereof, it is to be understood that the invention is not limited by the specific illustrations except to the extent defined in the following claims.

We claim:
1. The process for drying alkali metal cyanide crystals wet with aqueous solution, which comprises drying the wet crystals with hot air heated to a temperature of 400° to 800° F. while mixing the crystals to maintain the surfaces wet until the average moisture content of the crystals decreases to less than 2%.

2. In the process for recovering alkali metal cyanide from aqueous solution by evaporating water from the solution to form crystals of alkali metal cyanide, filtering the crystals from mother liquor and drying the wet crystals, the improvement which comprises drying the wet crystals with hot air at a temperature of 400° to 800° F. as the sole source of heat for drying and simultaneously mixing the crystals to maintain the surfaces wet.

3. The process for drying a wet filter cake of alkali metal cyanide crystals and aqueous mother liquor which comprises feeding the filter cake of wet crystals to a mixing conveyor, partially drying the wet crystals to a maximum moisture content of 10% in contact with hot air in the mixing conveyor while mixing the crystals to break up any lumps and expose the crystals uniformly to the hot air, feeding the partially dried crystals to a rotary drier, and completing the drying by mixing the crystals in the presence of hot air as the sole source of heat.

References Cited in the file of this patent

UNITED STATES PATENTS

| | | |
|---|---|---|
| 426,361 | Buttner et al. | Apr. 22, 1890 |
| 1,036,072 | Cairncross | Aug. 20, 1912 |
| 1,501,513 | Boberg | July 15, 1924 |
| 1,676,786 | Lissauer | July 10, 1928 |
| 1,877,733 | Martin | Sept. 13, 1932 |
| 2,054,520 | Pierce | Sept. 15, 1936 |
| 2,863,225 | Prussing et al. | Dec. 9, 1958 |